United States Patent [19]

Yamakawa

[11] Patent Number: 4,912,316
[45] Date of Patent: Mar. 27, 1990

[54] DETECTING APPARATUS WITH RESINOUS BODY

[75] Inventor: Masami Yamakawa, Yokohama, Japan

[73] Assignee: Wako Corporation, Yokohama, Japan

[21] Appl. No.: 216,585

[22] Filed: Jul. 7, 1988

[51] Int. Cl.[4] .......................... G01V 9/04; G06M 7/00
[52] U.S. Cl. .................................... 250/221; 250/222.1
[58] Field of Search .................. 250/222.1, 222.2, 221; 350/442, 252, 503

[56] References Cited

U.S. PATENT DOCUMENTS

| | | | |
|---|---|---|---|
| 3,584,226 | 6/1971 | Lerner | 250/222.1 |
| 4,097,800 | 6/1978 | Kuchmas, Jr. et al. | 250/222.2 |
| 4,346,292 | 8/1982 | Routt, Jr. et al. | 235/462 |
| 4,662,735 | 5/1987 | Karasaki et al. | 350/245 |
| 4,734,574 | 3/1988 | Tanaka | 250/221 |
| 4,739,160 | 4/1988 | Kawabe et al. | 250/222.1 |

OTHER PUBLICATIONS

Jakubowski, "Optical Sensing of Documents", *IBM Tech. Dis. Bull.*, vol. 12, No. 10, 3/70, p. 1694.

*Primary Examiner*—David C. Nelms
*Assistant Examiner*—Michael Messinger
*Attorney, Agent, or Firm*—Kramer, Brufsky & Cifelli

[57] ABSTRACT

A detecting apparatus for detecting an object passing through a space between a light emitting element and a light receiving element, comprises a first optical body forming a first mirror between a light emitting lens and a light receiving lens; and a second optical body forming a space passing the object therethrough by opposing to the first optical body, the second optical body having a second mirror. The light emitting element emits the light from the light emitting lens to the second mirror, while the light receiving element converts the light incident through the light receiving lens into electric signals. The light emitting and receiving elements are formed on a control circuit substrate. The aforesaid all components are incorporated compactly in a casing of the detecting apparatus.

6 Claims, 3 Drawing Sheets

DETECTING APPARATUS WITH RESINOUS BODY

BACKGROUND OF THE INVENTION

1. Field of the Invention

This invention relates to a detecting apparatus which enables to detect accurately passing of any relatively small-sized objects such as tablets, electronic parts or the like into a detecting space.

2. Description of the Prior Art

A conventional detecting apparatus is shown in FIG. 5, in which a detecting apparatus 1 comprises a casing 1a including a light collecting lens, a plurality of light emitting elements or the like, and a driving control circuit 45. Numeral 4 is a light emitting means, in which a plurality of infrared light emitting diodes 4a are disposed in a line. Numeral 41 is a light collecting means, in which are disposed a plurality of light collecting lens 41a, each of which is opposed to each light emitting diode 4a.

A detecting space 1b is formed in the center of the casing 1a and an object 7 to be detected passes through the detecting space 1b. Numeral 42 is a slit plate which is disposed across the detecting space 1b so as to oppose to the light collecting means 41. The slit plate 42 is to restrict the width of a luminous flux incident from the light collecting means 41 to enhance the detecting sensibility.

Numeral 44 is a light receiving plate which receives the luminous flux incident from the light collecting means 41 through the slit plate 42 to make a photoelectric conversion. The light receiving plate 44 is flattened and formed by silicone, photodiodes or the like. Numeral 43 is a visible light cutting filter which is formed between the slit plate 42 and the light receiving plate 44.

A driving control circuit 45 which is disposed behind the casing 1a comprises a power source circuit 45a, a circuit 45b for lighting the light emitting means 4 and a signal amplifying circuit 45c for amplifying the signal from the light receiving plate 44. The output signal of the signal amplifying circuit 45c is transmitted to a computer (not illustrated) for processing.

When the power source is switched on, all light emitting diodes 4a of the light emitting means 4 are lighted, thereby a light membrane is formed in the detecting space.

When any object 7 such as tablets, electronic parts or the like passes through the light membrane, part of the luminous flux is shaded, so that the light quantity incident to the light receiving plate 44 is varied. A slight electric variation caused as its result is amplified by the amplifying circuit 45c, thereby electric signals are outputted. The output signals are processed by the computer to detect e.g. the quantity of the objects.

Such a detecting apparatus has the following inconveniences and disadvantages:

(A) Since the light emitting means employs a large number of infrared light emitting diodes, the parts cost and their manufacturing cost are expensive. In addition, the consumption for electric power is increased, so that the running cost becomes costly. Further, it is indispensable to prevent such a large number of diodes from being heated.

(B) Since the area of the light receiving plate is considerably broad, it may be affected by any outer disturbing light or capture any noises of radiated electromagnetic waves, so that malfunctions of the present apparatus may occur frequently.

(C) By cutting part of the luminous flux incident to the light receiving plate from the light collecting lens by means of the slit plate, it is formed into a plate-type section. As a result, the most part of the luminous flux radiated from the light emitting diodes may be ineffective. Accordingly, only a small part of the luminous flux is available, so that the detecting sensibility of the light receiving plate is decreased.

BRIEF SUMMARY OF THE INVENTION

It is a general of this invention to provide a detecting apparatus which enables to detect accurately passing of any relatively small-sized objects such as tablets, electronic parts or the like into a detecting space.

According to a remarkable aspect of this invention, disposed upon a driving control circuit substrate are a light emitting element and a light receiving element, to each of which a light emitting lens means and a light receiving lens respectively are opposed. On the other hand, a reflective mirror is disposed in an optical path from the light emitting element to the light receiving element, thereby a light membrane is formed within a detecting space.

More specifically, the detecting space is formed by opposing a first optical body and a second optical body to each other, in which the first optical body comprises the light emitting lens means, the light receiving lens means and a first reflective mean therebetween, all of which are integrally made of a transparent resinous material. The second optical body comprises a second reflective means which is integrally made of the same transparent resinous material.

The driving control circuit substrate, the first optical body adjacent thereto and the second optical body opposing to the first optical body are all compactly mounted in a casing.

Other objects, features and advantages of this invention will be readily apparent from the following description of a preferred description thereof, taken in connection with the accompanying drawings, although variations and modifications may be affected without departing from the spirit and scope of the novel concepts of the disclosure.

BRIEF DESCRIPTION OF THE ACCOMPANYING DRAWINGS

DETAILED DESCRIPTION OF A PREFERRED EMBODIMENT

A preferred embodiment of this invention will now be described with the accompanying drawings.

Figure 1:
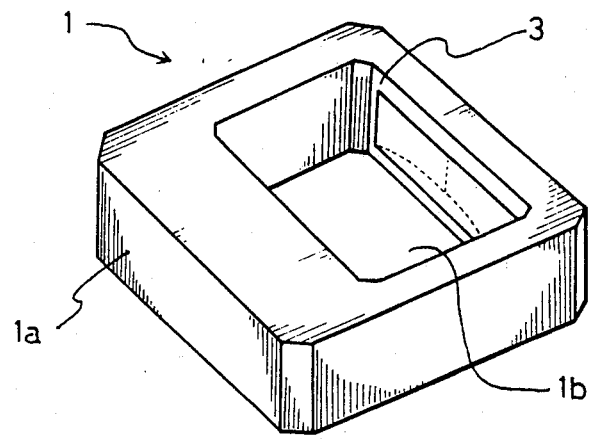
FIG. 1 is a perspective view of an outer appearance of a detecting apparatus according to this invention.
Figure 2:
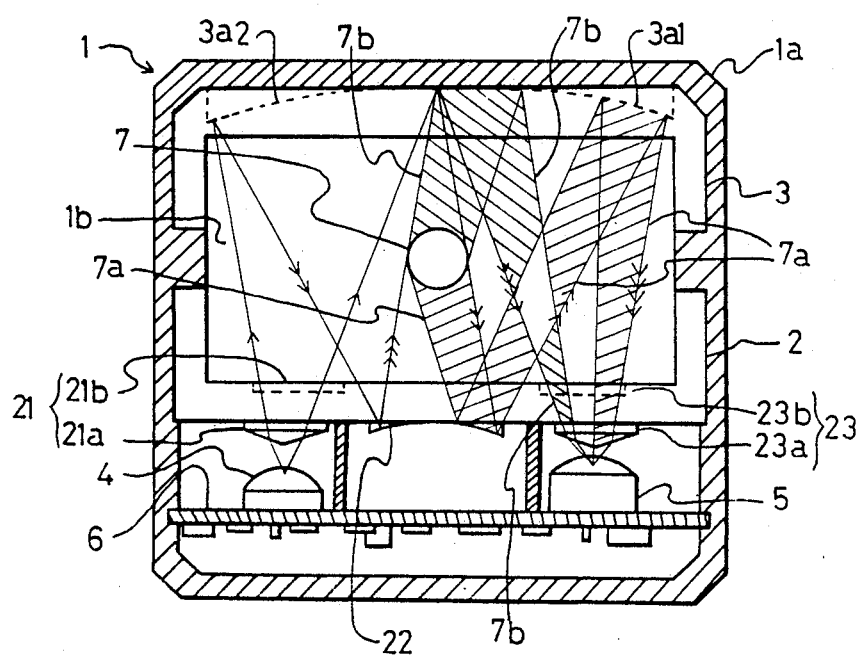
FIG. 2 is a section view of the detecting apparatus in FIG. 1.

FIG. 1 shows a perspective view of an outer appearance of a detecting apparatus 1 according to this invention, while FIG. 2 shows a section view of the detecting apparatus 1.

The detecting apparatus 1 has a detecting space 1b within a casing 1, in which various components are disposed. Numeral 2 is a first optical body which comprises a light emitting lens means 21, a convex mirror 22 having a spherical or cylindrical surface as a first reflective means and a light receiving lens means 23, all of which are integrally made of a transparent resinous material.

Numeral 3 is a second optical body which is opposed to the first optical body 2 so as to form the detecting space 1b therebetween.

The second optical body 3 comprises a concave reflective mirror 3a as a second reflective means which is made of the transparent resinous material. Numeral 4 is an infrared light emitting diode as a light emitting element while numeral 5 is a phototransistor as a receiving element, both of which are disposed on two ends of a driving control circuit substrate 6. Whereas the light emitting diode 4 is opposed to the light emitting lens means 21, the phototransistor 5 is opposed to the light receiving lens means 23.

Numeral 7 is an object to be detected which passes through the detecting space 1b formed between the first optical body 2 and the second optical body 3. Numerals 7a, 7b denote reflective paths of two shading portions which are formed at the time when the object 7 passes through a light membrane developing within the detecting space 1b.

Referring to FIGS. 3A, 3B, 3C and 3D, there is shown the first optical body 3 of a U-shaped section. Disposed upon a front surface of the first optical body 2 are the light emitting lens means 21, the light receiving lens means 23 and the convex mirror 22 as the first reflective mirror formed therebetween.

The light emitting lens means 21 comprises a first light emitting lens 21a and a second light emitting lens 21b formed on an opposite side of the first light emitting lens 21a. The first light emitting lens 21a is protruded forwardly in FIG. 3A, while downwardly in FIG. 3B. As shown in FIG. 3C, it is a non-spherical convex lens, while the second light emitting lens 21b is a non-spherical cylindrical lens.

Figure 3A:
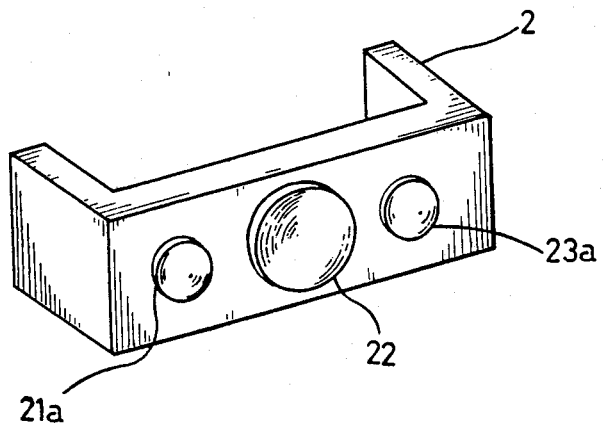
FIG. 3A is a perspective view of a first optical body in the aforesaid detecting apparatus.
Figure 3B:
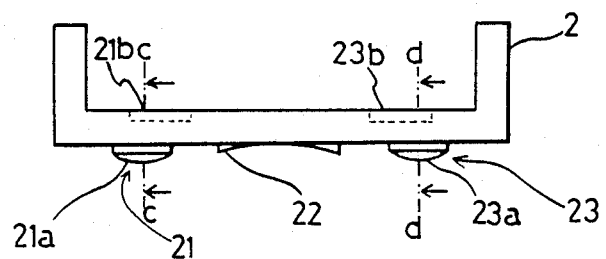
FIG. 3B is a plan view of the first optical body in FIG. 3A.
Figure 3C:
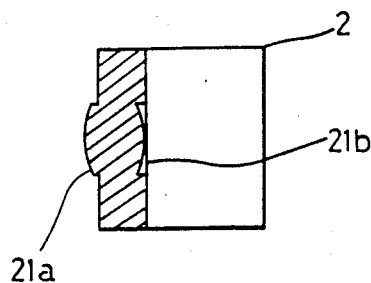
FIG. 3C is a section view taken on line c—c of FIG. 3B.

The convex mirror 22 as the first reflective means is disposed forwardly in FIG. 3A and its circular concave part is protruded downwardly in FIG. 3B. It is plated by a vacuum deposition so as to perform the function of a convex mirror.

Figure 3D:
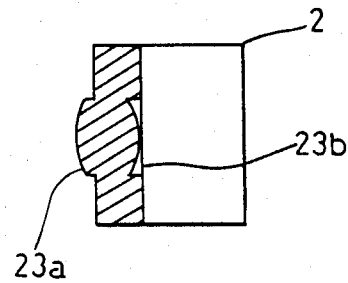
FIG. 3D is a section view taken on line d—d of FIG. 3B.

As clearly shown in FIG. 3D, the light receiving lens means 23 comprises a first convex light receiving lens 23a as a non-spherical convex lens and a second cylindrical light receiving lens 23b as a non-spherical cylindrical lens opposed to the former.

Figure 4:
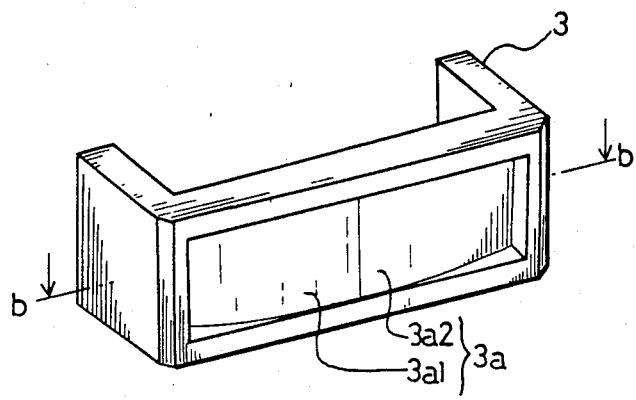
FIG. 4A is perspective view of a second optical body in the aforesaid detecting apparatus.
FIG. 4B is a section view of the second optical body on line b—b in FIG. 4A.
Figure 4:
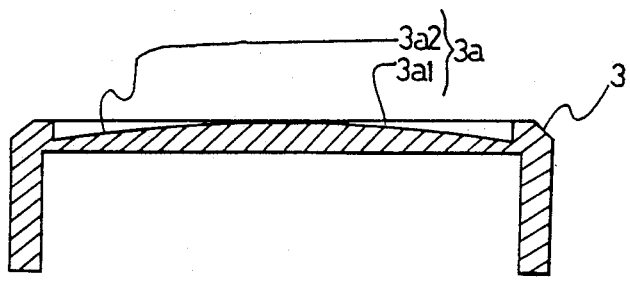
Figure 5:
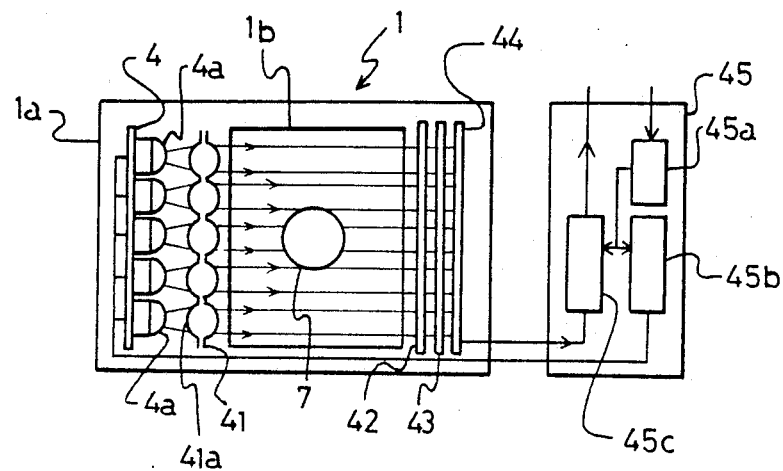
FIG. 5 is a plan view of a conventional detecting apparatus.

Referring to FIGS. 4A and 4B, the second optical body 3 of a U-shaped section comprises an integral concave reflective mirror 3a as a second mirror means on a front surface thereof so as to oppose to the second light emitting lens 21b, the first reflective means (convex mirror) 22 and the second light receiving lens 23b respectively of the first optical body 2. The concave reflective mirror 3a is made of a transparent resinous material and plated on a front surface of the second optical body 3 by means of a vacuum deposition.

According to this embodiment, the concave reflective mirror 3a consists of two divided segments, i.e. a first concave reflective mirror 3a1 and a second concave reflective mirror 3a2, each of which has the same spherical profile and the same curvature. Yet, it is also possible to form a sheet of concave reflective mirror 3a without separation.

Incorporated in the casing 1a are disposed the first optical body 2, the driving control circuit substrate 6 formed therebehind having the light emitting element 4 and the light receiving element 5, and the second optical body 3 opposed to the first optical body 2 so as to form the detecting space 1b.

An operation of this embodiment will now be described hereinafter.

When a power source (not illustrated) of the detecting apparatus 1 is switched on and the light emitting element 4 emits infrared rays by actuating a lighting circuit (not illustrated) of the driving control circuit substrate 6, the infrared rays are collected by the light emitting lens means 21 formed immediately before the light emitting element 4. Then, the infrared rays are irradiated upon the second concave reflective mirror 3a2 of the second optical body 3 within the detecting space 1b.

More specifically, when the light incident to the light emitting lens 21 from the light emitting element 4 passes through the first light emitting lens 21a and the second light emitting lens 21b, it is irradiated in a fan-shaped form toward the second concave reflective mirror 3a2, and then a thinly elongated light image is cast thereupon.

Then, a first reflection is made. Namely, the light image is cast upon the convex mirror 22 as the first reflection means.

Then, a second reflection is made upon the convex mirror 22. The luminous flux is diffused a little and cast upon the first concave mirror 3a1 of the second optical body 3. The light image cast thereupon displays a thinly elongated form like that upon the second concave mirror 3a2. A third reflection is made upon the first concave reflective mirror 3a1, and the luminous flux is received by the light collecting lens 23 and finally by the light receiving element 5.

The luminous flux which has been developed between the first concave reflective mirror 3a1 and the light receiving lens 23 displays a fan-shaped form like that between the second concave mirror 3a2 and the light emitting lens means 21, and forms a collected point upon the light receiving element 5, passing through the second light receiving lens 23b and the first light receiving lens 23a.

As described above, the light outputted from the light emitting element 4 is reflected repeatedly between the first optical body 2 and the second optical body 3, thereby a light membrane is formed within the detecting space 1b to enable detection.

When the object 7 to be detected passes through the detecting space 1b as shown in FIG. 2, part of the light membrane is shaded, so that the quantity of the light cast upon the light receiving element 5 is decreased and the electric signal outputted from the light receiving element 5 is varied slightly. Such a slight electrical variation is amplified and outputted by an amplifying circuit in the driving control circuit 6.

When the object 7 passes through the light membrane of the detecting space 1b, there occur two shading portions, namely a first shading portion 7a formed by the luminous flux directing from the second concave mirror 3a2 to the convex mirror 22 and a second shading portion 7b formed by the luminous flux directing from the convex mirror 22 to the first concave mirror 3a1.

Those shading portions 7a, 7b are also received by the light receiving element 5, repeating reflections. As a result, when the object having such a size as shown in FIG. 2 passes through the light membrane, about two-third of the quantity of the light cast on the light receiving element 5 are shaded thereby the variation ratio of the light quantity reaches 66% that are about twice as large as a conventional one. Hence, the detecting sensibility of the present detecting apparatus is enhanced remarkably.

Further, an optical path length from the light emitting element 4 to the light receiving element 5 is extended longer as the result of repeated reflections. That is, the luminous flux is emitted through such an extended optical path and finally collected by the light receiving element 5. It means, so to speak, extension of a focal distance of the light emitting lens means 21. Therefore, the influence of any outer disturbing light is very little.

The following are several remarkable effects of the detecting apparatus according to this invention.

(1) Since the light emitting element and the light receiving element are disposed on the driving control circuit substrate, the shortest wiring is available. Accordingly, the detecting apparatus can be produced compactly and its manufacturing cost is also reduced.

(2) Since only one light emitting element is required, the apparatus becomes more compact. Accordingly, its power consumption and calorific value can be reduced.

(3) The light receiving element can be formed as a chip of 1 mm×1 mm in size. It becomes 1/50 to 1/100 as small as the conventional photodiode. Accordingly, the influence of electromagnetic wave noises upon such a small-sized chip is declined remarkably. In addition to the betterment of the detecting accuracy, the manufacturing cost is reduced.

(4) Since the optical path between the light emitting element and the light receiving element is extended longer, it is possible to hinder the influence of any outer disturbing light, so that it is unnecessary to dispose any filter for cutting a visible light.

(5) The sectional thickness of the luminous flux developing within the detecting space is thinned by the optical system as described above, so that the light quantity of the present detecting apparatus is not attenuated in comparing with such a conventional technique as to pass the light through the slit plate.

Thus, in addition to the betterment of the detecting sensibility, no slit plate is required, so that the detecting apparatus can be produced compactly at a lower cost.

(6) When the object to be detected passes through the light membrane of the detecting space, there occur two shading portions. Accordingly, the variation ratio of the light cast upon the light receiving element is about twice as large as the conventional one, thereby the detecting sensibility is enhanced.

(7) The first optical body comprises the light emitting lens means, the first reflective means and the light receiving lens means, all of which are formed integrally.

The second optical body comprises the second reflective means integral therewith. Accordingly, the optical accuracy is secured, and assembling becomes easier. In conclusion, productivity of the detecting apparatus according to this invention is increased greatly.

What is claimed is:

1. A detecting apparatus for detecting an object passing through a space between a light emitting element and a light receiving element, comprising:
    a first optical body forming a first reflective means between a light emitting lens and a light receiving lens means, said first optical body being integrally made of a resinous material;
    a second optical body forming a space passing said object therethrough by opposing to said first optical body, said second optical body having a second reflective means, said second optical body being made of a resinous material;
    said light emitting element emitting the light from said light emitting lens means to said second reflective means;
    said light receiving element converting the light incident through said light receiving lens means into electric signals;
    a driving control circuit substrate having said light emitting element and said light receiving element;
    a casing for incorporating therein all of said components;
    said light emitting lens means including a first light emitting lens as a non-spherical convex lens and a second light emitting lens as a non-spherical cylindrical lens, the former being adapted to receive the light from said light emitting element, while the latter being adapted to emit the received light toward said second reflective means;
    said light receiving lens means including a first light receiving lens as a non-spherical convex lens and a second light receiving lens as a non-spherical cylindrical lens, the former being adapted to transfer the light into the light receiving element, while the latter being adapted to receive the light from said second reflective means; and
    said first reflective means being a spherical or cylindrical convex mirror, while said second reflective means being a concave mirror.

2. A detecting apparatus as claimed in claim 1, in which said first optical body comprises said light emitting lens means, said light receiving lens means and said first reflective means therebetween, all of which are integrally made of a transparent resinous material.

3. A detecting apparatus as claimed in claim 1, in which said second optical body and said second reflective means included therein are integrally made of a transparent resinous material.

4. A detecting apparatus as claimed in claim 2, in which said first reflective means comprises a convex mirror having a spherical or cylindrical surface, which is plated by a vacuum deposition.

5. A detecting apparatus as claimed in claim 3, in which said second reflective means comprises a concave reflective mirror, which is plated by a vacuum deposition.

6. Detecting apparatus for detecting an object passing through a space, comprising:
    a first optical body formed of a transparent resinous material, said optical body including:
    a light emitting lens;
    a light receiving lens; and
    first means for reflecting light;

a light emitting element disposed on a driving control circuit substrate to transmit light through the light emitting lens;

a light receiving element disposed on the driving control circuit substrate to receive light through the light receiving lens; and a second optical body formed of a transparent resinous material, said second optical body disposed opposite said first optical body and forming a detecting space therebetween through which an object to be detected is passed, said second optical body including:

second means for reflecting a portion of the light transmitted through the light emitting lens unto the first means for reflecting light, and for reflecting a portion of the light transmitted through the light emitting lens unto the light receiving lens, and for reflecting light reflected unto the first means for reflecting light unto the light receiving lens;

whereby a light membrane is formed within the detecting space.

* * * * *